April 10, 1951
R. VACHON
2,548,506
CLAMPING AND STRETCHING TOOL FOR TIRE INNER TUBES
AND THE LIKE RUBBER GOODS
Filed Oct. 20, 1949
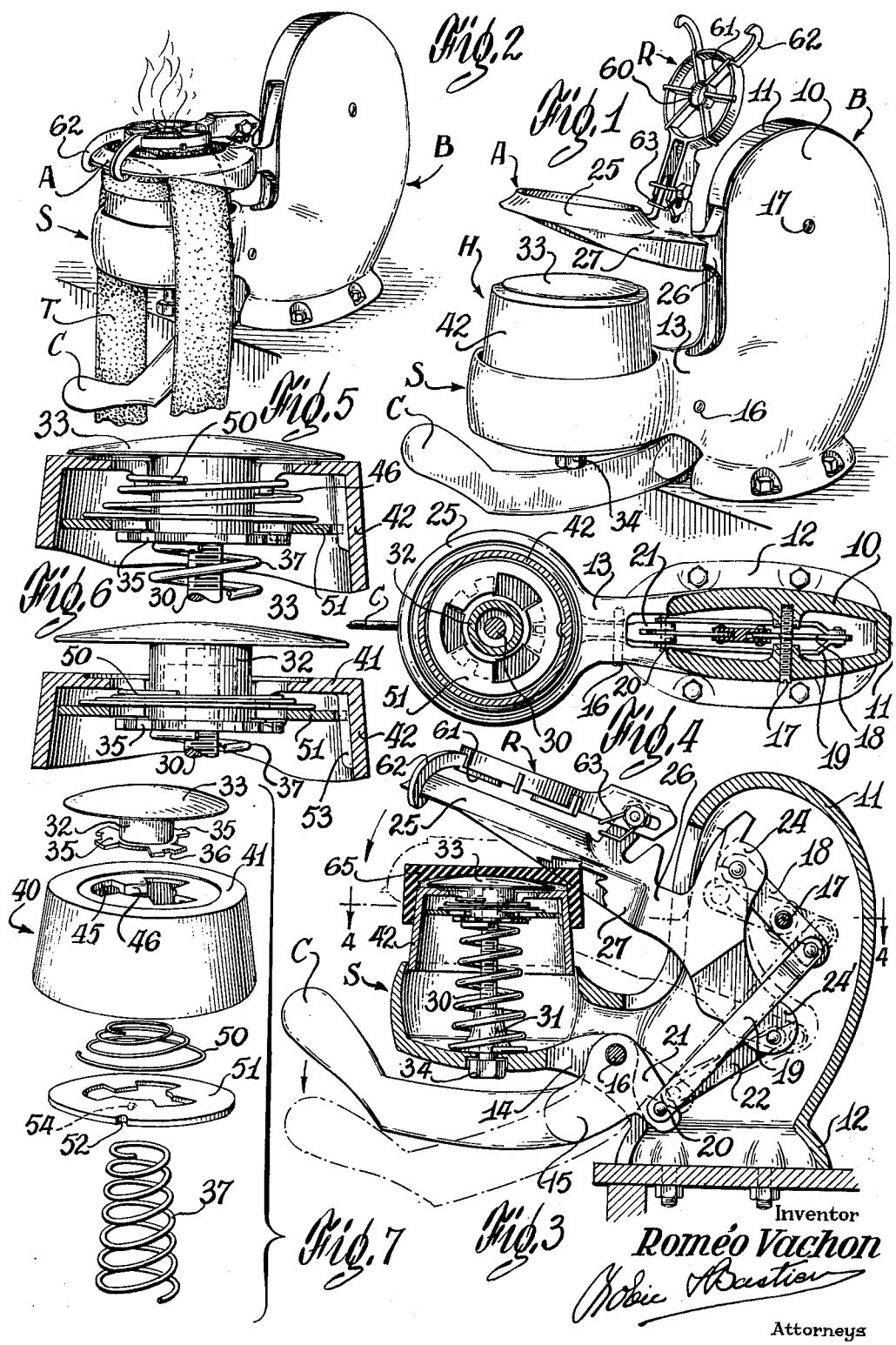
Inventor
Roméo Vachon
Attorneys Patented Apr. 10, 1951

2,548,506

UNITED STATES PATENT OFFICE 2,548,506

CLAMPING AND STRETCHING TOOL FOR TIRE INNER TUBES AND THE LIKE RUBBER GOODS

Roméo Vachon, Montreal, Quebec, Canada

Application October 20, 1949, Serial No. 122,434

5 Claims. (Cl. 81—15.2)

The present invention relates to rubber goods handling tools and, more particularly, such a tool for holding or clamping tire inner tubes, and the like, for the purpose of treating such tubes in a slightly stretched condition.

In the treatment of tire inner tubes, generally when such tubes must be repaired, or "patched" as is the current expression, the preliminary operation consists in a thorough cleaning of the area surrounding the damaged, torn or perforated rubber portion. Such a cleaning comprises removing the sulphur, grease and other surface matter adhering to the tube, this operation being performed by means of an abrasive, or tool, intended to roughen the surface and bare the clean rubber.

Obviously, the tube must be securely supported during this cleaning treatment, the common practice being the resting of the tube upon a projecting bracket, or the like, secured to a work bench or other stationary member; the tube is then held by hand and the surface thereof abraded to form a clean area susceptible to the receiving of a suitable cement for adhesively retaining a so-called hot or cold "patch."

The abrading operation mentioned above is not necessarily the best, or ideal, treatment apt to produce the clean, foreign matter-free, surface required to obtain perfect adhesion of the patch; but, under conditions of normal expediency, it is the quickest for average good results, due to the inherent resiliency of rubber resisting the action of too fine an abrasive.

So, to avoid tedious rubbing with solvents and fine abrasives producing a fine dust tending to be rubbed in the rubber, resort is had to rough abrading forming easily-blown, or dusted, particles.

Practically speaking, however, this practice leaves the surface of the rubber with a network of criss-cross lines forming therebetween a pile-like network of partly-detached rubber "fibres" which, after "patching," are interposed between the ruber mass and the "patch," thereby weakening the entire assembly.

In U. S. application for Patent No. 785,835, dated November 14, 1947, I have disclosed means for avoiding the drawbacks noted above, the concept of the invention therein being to abrade the surface of rubber kept under stretching tension, the said means being embodied in a tool for rapidly and easily clamping a tire inner tube, to hold it stationary, a stretching stress being simultaneously applied. So secured, an inner tube can be cleaned quickly and efficiently with a minimum of effort and trouble.

The present invention is an improvement over the above-noted tool and its primary object is, accordingly, the provision of a device of the character described which is more efficient for the purpose in view and of improved operation.

Another object resides in the provision of a clamping and stretching tool of simplified character, rugged construction and improved appearance.

A further object contemplates a tire tube clamping tool embodying tube-stretching means whereby a uniform tension can be imparted to a tube irrespective of its thickness.

Still another object contemplates a tool of the type in view which is simple to construct, service and relatively inexpensive.

Still another object envisages a tube clamp and stretcher adapted also to the vulcanizing of the known patches directly upon the cleaned tube by heat derived from a chemical or other heating unit.

Other objects and advantages of the invention will become apparent, or be pointed out further, during the description to follow.

As an example, and for purposes of illustration only, an embodiment of the invention is shown in the annexed drawing wherein:

Figure 1 is a perspective three-quarter view of the tool in released position;

Figure 2 is a similar view showing the tool in clamping position over a tire tube and a so-called "match-patch" being vulcanized thereon;

Figure 3 is a vertical section through the tool in released position;

Figure 4 is a transverse horizontal section taken on line 4—4 of Fig. 3;

Figure 5 is a part, enlarged, vertical section through the differential head of the tool in its position of rest;

Figure 6 is a similar view but showing the head cone in depressed position, and, Figure 7 is a composite perspective view of the elements constituting the head in relative disassembled arrangement.

Referring to the drawing, wherein similar reference characters represent corresponding parts throughout, the letter B designates the body of the tool, having an extension socket S, H the head concentrically supported in said socket, A the tube clamping annulus and C the tool-operating handle.

The body B constitutes the frame of the tool-operating levers, more specifically: the means for arcuately moving the annulus with respect to the head.

Said body is a hollow shell of substantially elliptic form in elevation, said shell comprising a pair of parrallelly-spaced side walls 10 joined together by a narrow transverse marginal edge 11, thereby defining an inside space in which the operating means are housed. As shown in Fig. 3, the lower end of the body is open and enlarged laterally to form a base 12 having holes for connection to a bench or the like stationary surface.

At the lower front end of the body there is cast integrally therewith the socket S which, as illustrated in section in Fig. 3, is a circular cup-like member joined to the body by the neck 13 and adapted to receive the head H. The said neck is slotted underneath at 14 to receive the bell crank lever 15, constituting the handle C, and pivoted around the pivot pin 16.

A second pivot pin 17, mounted substantially at the upper center of the body, serves as a pivot for a short lever 18 movable in a plane parallel to that of the walls 10. To the right end of said lever there is connected a clevis 19 the forked ends of which are connected with the crank 21 of the lever 15 by the pin 20. A slot in said crank receives a link 22 pivoted also around the pin 20.

Both the lever 18 and link 22 serve to support and rock the annulus A through the intermediary of its arm 26, extending from the body through a slot 23, and provided with short and long inner arms 24 and 24'; connected, respectively, to lever 18 and link 22 calculated to impart to said arm 26 an arcuate composite movement such that the annulus will contact the head H squarely all around.

The operation of annulus A should be evident from the illustration of Fig. 3; the arcuate motion of crank 21 imparts to the clevis and link a longitudinal movement which is applied to both arms 24, simultaneously, but in reverse directions due to the interposed small lever 18. Thus, the short arm 24 will be depressed while the long one is being raised, these combined movements being co-ordinated for the purpose noted above. Furthermore, the link 22 acts as a toggle to lock the annulus in depressed position when the handle C has been pushed down as far as it will go.

The annulus A is formed of downwardly diverging rim 25 integral with an arm 26 reinforced by flanges 27 at the junction between arm and annulus, said arm being pivotally supported within the body, as previously explained, and adapted to raise the annulus from, or lower same against, the head H.

This head is a composite mechanism having a differential relative movement between its constitutive elements, for a purpose to be defined later. As shown clearly in Fig. 3 the entire head is mounted concentrically in the socket S upon a threaded spindle, or bolt, 30 which, in turn, is co-axially slidable vertically within the centrally bored boss 31.

Said spindle is threadedly engaged with the shank 32 of a large plano-convex button 33 having the convex face upward. At the bottom of the shank, in spaced parallel relation with the plane face of the button, there is formed a flange having a plurality of segments 35, in the present instance three, equally spaced around the periphery of the shank and radially projecting therefrom. Each of the said segments has a notch 36 cut centrally in the outer arcuate edge thereof.

The button is maintained yieldingly in an uppermost position by means of a stout coil spring 37, slipped over the spindle 30 and boss 31, and tensioned between the bottom of socket S and the under side of shank 32. Thus, the said button may be said to be immovably supported against any downward pressure not exceeding the upward thrust of spring 37, said thrust being limited by the bolt head 34.

Concentrically associated with the button, and slidable on the shank thereof, a truncated cone 40 is provided consisting of a top plane ceiling or face 41 having a downwardly depending and flaring skirt 42, the said face 41 being but slightly larger in diameter than the button 33 and adapted, normally, to rest against the plane surface of said button (see Fig. 5).

For removably inserting the cone over the segmented flange of the shank, apertures 45 are cut in the face 41 of the cone, said apertures corresponding in shape and spacing to the segments of the shank and radially formed with respect to a central opening such as to allow passage of said shank. Consequently, the cone is movable relative to the button, this movement being a sliding displacement along the shank, the edge of the central opening in 41, between the segmental apertures 45, having a right-angular flange 46 forming a bearing assisting the smooth displacement noted above, and performing another function to be defined eventually.

As mentioned above, the cone is intended to be held against the button and, for that purpose, a tapering coil spring 50 is used between said cone and a large washer 51 held over the flange segments 35. To place said washer over the segments, in the position shown in Fig. 5, for instance, it must be slipped over said segments and, obviously, be apertured accordingly. Therefore the washer is provided with the same aperture formation as the cone surface 41 and additionally notched at 52 to engage the vertical rib 53 cast internally on the skirt 42 immediately below the top or ceiling of the cone. A small lug 54 is cast on the washer for engagement with any one of the notches 36 of the shank segments.

Assembled as above described the cone is held by the spring 50 against the button, the said spring being weaker than spring 37 and, consequently, allowing the cone first to be displaced downwardly until the flange 46 contacts the washer 51 supported on the segments 35 of the button shank. Therefore, downward pressure on the head H will displace the cone and, thereafter, the button 33 when said pressure exceeds the upward thrust of spring 37.

This differential action of the head H is the main characteristic of the invention, whereby a given stretching stress only is applied to a tube or the like clamped by the annulus. Irrespective of the thickness of such tire tube the annulus can be brought down to its downward locking position, as a function of the toggle link already mentioned and any excess material opposing this downward movement causing displacement of the button against the pressure of spring 37.

As will be evident from the showing of Fig. 2, a tire tube to be repaired is first placed across the button and smoothed in place, with the damaged part uppermost. The handle C is then lowered to apply the annulus concentrically with respect to the button, over the tire tube T. The annulus rim being downwardly divergent, as stated previously, will clamp said tube against the upper edge of the cone: as the said annulus is lowered to the downward end of its travel, and locked in place, the tube clamped between the annulus and cone will be downwardly entrained thereby and the medial button-supported part stretched over the stationary button. The stretched part can then be cleaned, available as it is through the aperture of the annulus, in any convenient manner such as scratching.

The rubber being abraded while in extended condition results in a much finer, and smoother, texture after it is released, the fine-grained surface so obtained being conducive to much better adhesion and solidity of the patch.

Obviously, the stretching tension is a direct function of the stiffness of spring 50, at least for the initial downward movement of the annulus; depending on the thickness, and stiffness, of the tube being clamped the cone is depressed more or less until the pressure exceeds the stiffness of spring 37, whereupon the button may be depressed in turn. Consequently, irrespective of the characteristics of the rubber being clamped, the maximum stresses applied to the rubber and head are limited to by the stiffness of the main spring 37.

So constructed, the tool of the invention is quite efficient to meet the objective in view and, concurrently, ideally adaptable to the vulcanizing of patches and the like on a small scale, such as the repairing of punctures, small cuts, abrasions and the like common to automobile tire tubes.

For that purpose a simple ring R is pivoted to a projection of the annulus arm 26, said ring having a smaller inner ring 60 held by the radial spokes 61 and formed with the hooks 62. The ring is loosely pivoted, and raised by a spring 63 when not in use.

For vulcanizing a patch, after the tube has been cleaned, the tension of the annulus is released, a heat insulating rubber or the like cap 65 inserted over the cone and the tube placed on said cap and the annulus lowered with just enough tension to hold the tube without stretch.

A heat-cured patch is then applied and held in place by the spokes of the ring R, which is then hooked in place over the edge of the rim 25 (see Fig. 2). The patch is then heated in any suitable manner, such as by an electric element associated with the ring, or by firing a chemical pellet combined with the patch and known as a "match patch" or "hot patch."

From the foregoing, it should be evident that the present invention is an advance in the art of repairing and vulcanizing rubber tubes and like articles.

According to this invention a tool is provided in which a tube may be clamped securely, safely and rapidly, leaving both hands of the operator free to perform an efficient job of cleaning the tube surface. Furthermore, said tube is simultaneously stretched a given maximum amount well within the elastic limits of the article processed.

Finally, the tool described is rugged, of pleasing appearance, simple to service and operate and, for all its advantages and qualities, relatively inexpensive. Its use protects the articles treated against undue stresses, keeps them off floors and dirty benches and permits the vulcanizing operation to proceed without attention.

It must be understood that various changes as to the shape, size and arrangement of parts may be resorted to without departing from the spirit of the invention or the scope of the subjoined claims.

Having thus described my invention, I claim:

1. In a clamping and stretching tool for elastic articles such as rubber, an annulus and means for arcuately moving said annulus, a truncated cone against the upper edge of which the annulus is adapted to be lowered, a plano-convex button co-axial with and surmounting the cone, a spindle supporting the button, a spring resiliently supporting said button, a shank depending from the button extending within the cone, a flange on the lower end of said shank, and a spring between the cone and the flange for urging the cone against the plane surface of the button, said cone spring being weaker than the button spring.

2. A tool for clamping a tire tube in stretched condition, comprising an annulus, an arm supporting said annulus, levers for arcuately moving said annulus, and a differentially movable resilient head in the path of the annulus movement, said head including in co-axial arrangement a truncated cone, a plano-convex button above the cone and having a shank inside the cone, a stiff spring for holding the button in a given position, and a weaker spring between a flange on the shank and the top of the cone for urging said cone against the plane surface of the button.

3. In a tool as claimed in claim 2, a body for housing the annulus-actuating levers, a socket integral with said body for receiving concentrically the differential head, a spindle having a head loosely mounted in the socket co-axially therewith, said spindle being secured to the lower end of the button shank, the stiff spring being mounted over said spindle and tensioned between the socket and shank against the movement-limiting action of the spindle head, a large washer over a flange of the shank, the weaker spring being tensioned between said washer and the top of the cone, and means on the cone, washer and flange for preventing relative rotary movement therebetween.

4. A tool of the character described, comprising an annulus, an arm supporting said annulus, levers for arcuately swinging said annulus, a body for securing the levers in pivoting position, and a differentially movable resilient head in the path of the annulus movement, said head including in coaxial arrangement a truncated hollow cone and a plano-convex button above the cone, a shank depending from the plane surface of the button and extending inside the cone, a flange at the free end of the shank, a spring between the flange and the inner surface of the top of the cone for urging said cone against the button, a stiff spring between the under end of the shank and the body for urging the button upwardly, and an axial spindle extending below the shank and inside the stiff spring for limiting the upward movement of the button and guiding the same vertically.

5. In a tool as claimed in claim 2, the flange of the shank consisting in a plurality of segments radiating uniformly from said shank, and the truncated cone comprising a top surface having a central aperture through which the button shank extends and a plurality of segment-like openings radiating uniformly outwardly from said aperture, said openings corresponding in number and size with the flange segments of the button, whereby the truncated cone can be separated from the button by registration of the shank segments opposite the cone segment openings.

ROMÉO VACHON.

REFERENCES CITED

The following references are of record in the file of this patent:

UNITED STATES PATENTS

| Number | Name | Date |
| --- | --- | --- |
| 1,539,782 | Stansel | May 26, 1925 |
| 1,908,871 | Simpson | May 16, 1933 |
| 1,990,091 | Pfeifle | Feb. 5, 1935 |
| 2,377,351 | Martin | June 5, 1945 |